Feb. 28, 1961 L. G. WARD ET AL 2,973,171
IN-FLIGHT CONNECTION FOR AIRCRAFT
Filed Jan. 15, 1957 4 Sheets-Sheet 1
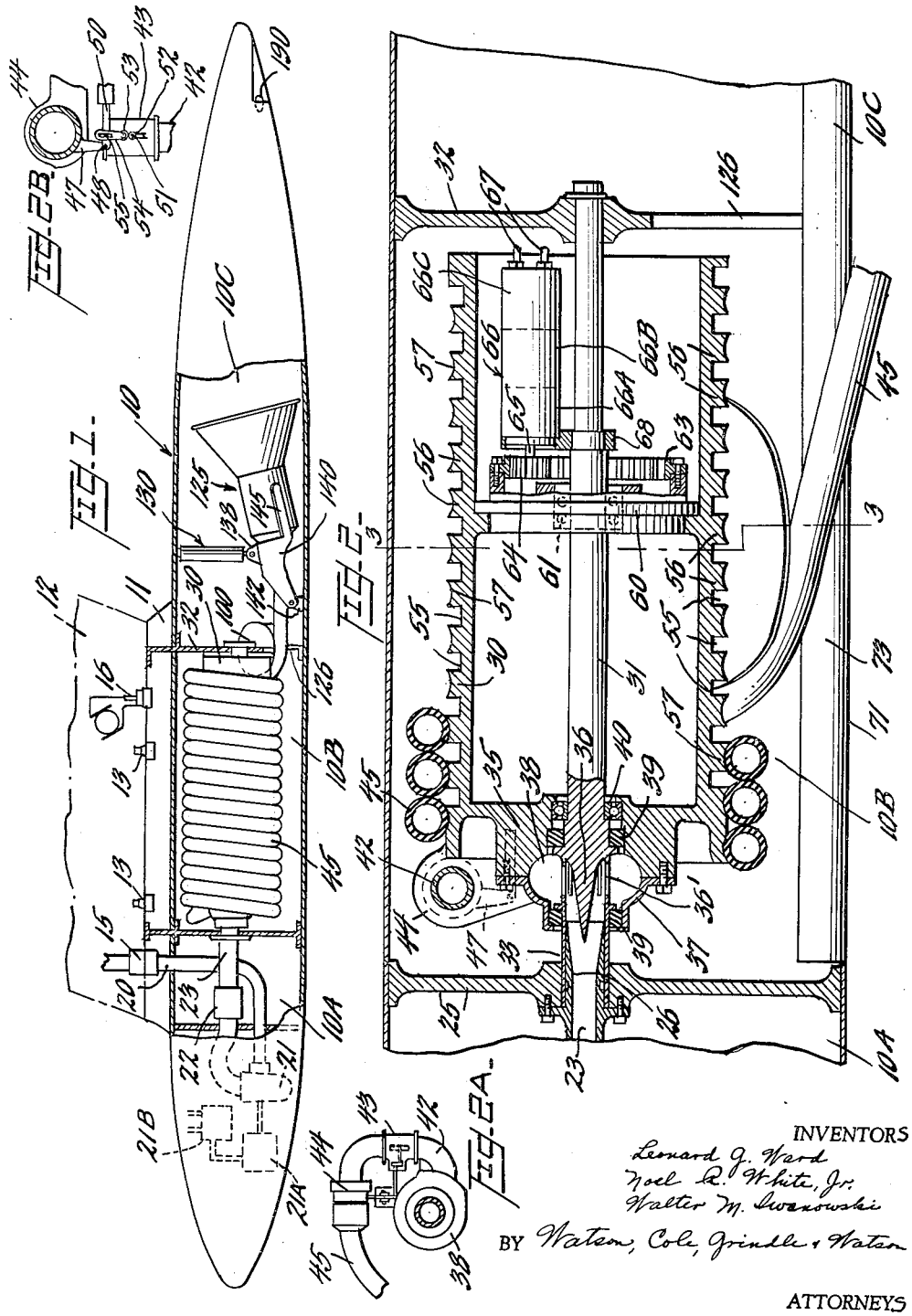
INVENTORS
Leonard G. Ward
Noel R. White, Jr.
Walter M. Swanowski
BY Watson, Cole, Grindle & Watson
ATTORNEYS

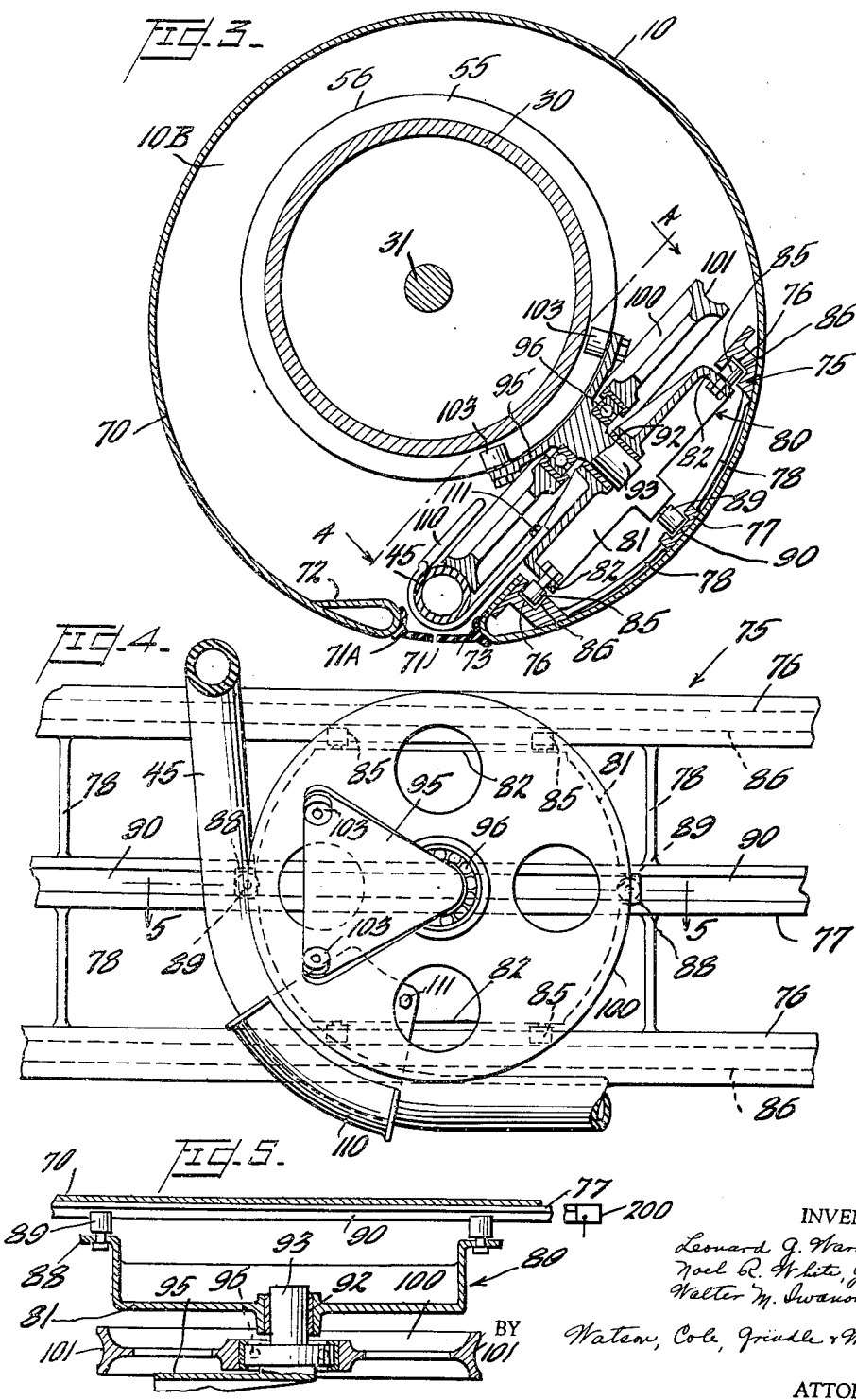
Feb. 28, 1961 — L. G. WARD ET AL — 2,973,171
IN-FLIGHT CONNECTION FOR AIRCRAFT
Filed Jan. 15, 1957 — 4 Sheets-Sheet 2
INVENTORS
Leonard G. Ward
Noel R. White, Jr.
Walter M. Iwanowski
BY Watson, Cole, Grindle & Watson
ATTORNEYS

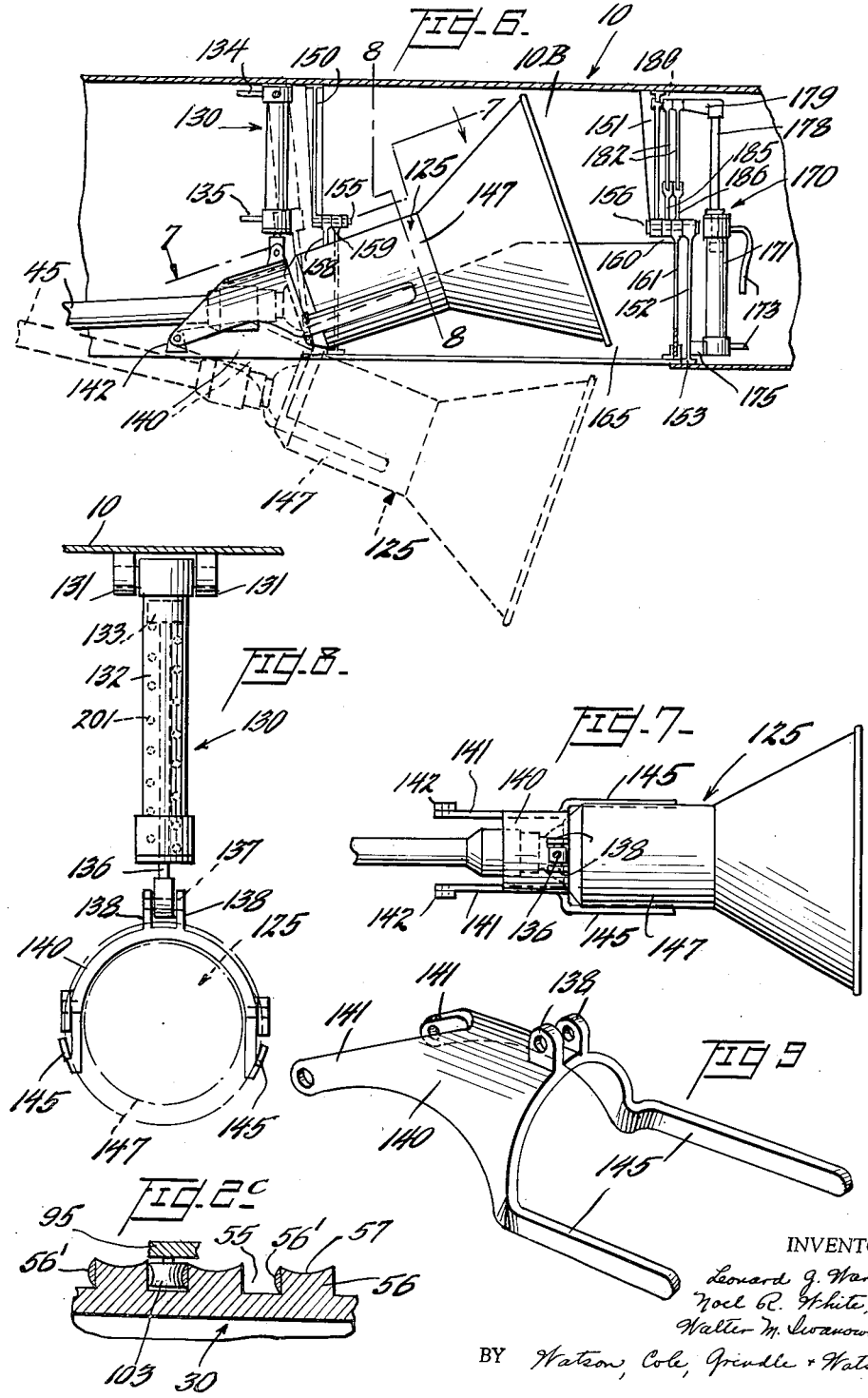

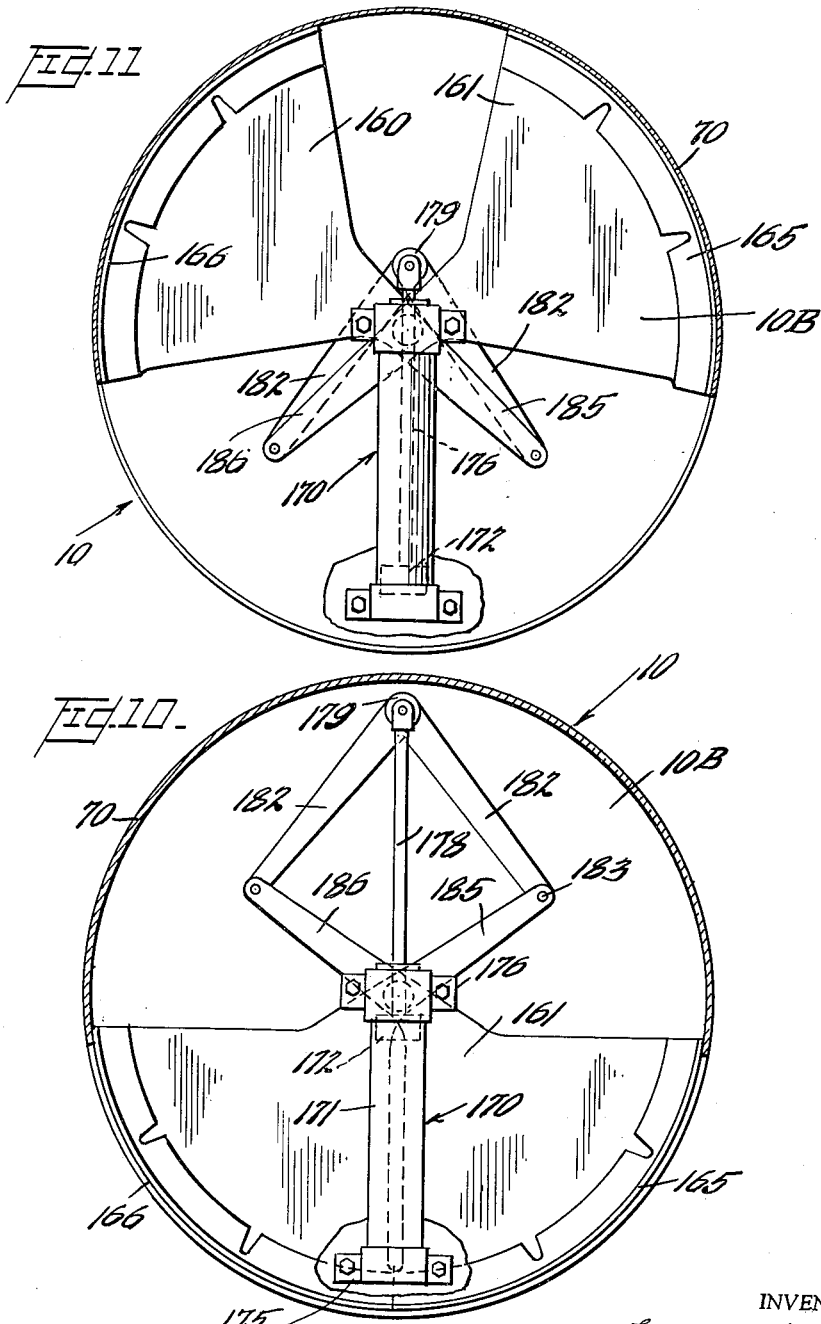

United States Patent Office 2,973,171
Patented Feb. 28, 1961

2,973,171

IN-FLIGHT CONNECTION FOR AIRCRAFT

Leonard G. Ward, Linthicum Heights, Noel R. White, Jr., Annapolis, and Walter M. Iwanowski, Catonsville, Md., assignors to Flight Refueling Incorporated, Baltimore, Md., a corporation of Delaware Filed Jan. 15, 1957, Ser. No. 634,208

7 Claims. (Cl. 244—135)

This invention relates to the operative connecting of aircraft in flight whether for towing, refueling or other purposes, and more particularly to equipment for the leading aircraft for supporting, enclosing, and manipulating the connecting line and a coupling-and-drogue member.

The general object of the invention is to provide a novel and improved substantially self-contained unit for installation on an airplane for containing and manipulating such a connecting means and the equipment appurtenant thereto.

In the illustrated embodiment of the invention, the novel principles have been adapted to the refueling of aircraft in flight, and the unit is in the form of a refueling package for installation on a tanker plane.

In its preferred embodiment, the invention contemplates the provision of a pod adapted for external installation on the tanker, the pod being a completely self-contained refueling device except for the bulk of the fuel supply at low pressure, and some small amount of electrical power for control purposes. The pod may be of substantially the profile of a conventional external fuel tank and has a minimum of connections with the tanker airplane; for example, supporting lugs, a fuel conduit connection, and an electrical connection. Preferably the pod is of a disposable type and can be jettisoned under emergency conditions. For this purpose, the supporting lugs and the fuel and electrical connections between the pod and the airplane are of the quick-detachable type, the fuel conduit in the tanker proper being equipped with shut-off valves to prevent unnecessary loss of fuel under these conditions.

The pod is furnished with a line pump for boosting the pressure of the fuel supply before delivery to the hose, and since the refueling package is required to be self-contained, a single power source is provided within the pod for operating the line pump and the hose reel, and also for actuating devices for properly stowing and enclosing the drogue-and-coupling unit and releasing it as required.

As a compact power pack, several devices are available, but a turbine is preferred. It is contemplated that the fuel pump in the package unit may be driven directly from the power source and that sufficient power be tapped off to opreate a hydraulic system which controls the hose reel, the drogue hoist, the doors of the drogue storage compartment, and any other auxiliary that may be employed. Alternatively, the pump also may be powered from the hydraulic system.

The unit contemplates that the fuel system comprise the quick-disconnect joint to the tanker aircraft fuel supply, the line pump for increasing the pressure before delivery to the hose, a fuel shut-off and vent valve, a rotary seal at the junction of the fixed fuel conduit and the hose reel or drum, and a hose-jettisoning and shut-off valve at the junction of the hose and the drum.

One of the principal features of novelty of the present invention concerns the construction, mounting, and level-wind arrangements of the hose or cable reel. It is desirable in a refueling system of the class described to provide accommodation for approximately eighty feet of hose. Considering the limitations on the transverse dimensions of the pod, the stowing of about eighty feet of hose or cable on a transversely mounted reel would entail the winding of multiple layers of cable or hose. Experience has shown this to be undesirable because of the possibility of crushing the hose on the inner layers. In order to obviate this difficulty, there is provided by the present invention a grooved reel having its axis disposed in a fore-and-aft direction in order to accommodate the requisite length of hose or cable wound about a reel or drum in a single layer, which arrangement yields a number of advantages, among which may be cited those of maintaining a constant relationship between cable or hose tension and torque at the drum, and supporting the hose adequately against crushing (when a hose comprises the connecting line). In this latter respect, a saving in weight of hose can be made over an arrangement where the hose is carried on a flat surfaced drum or where several layers are supported. Any concern about inherent imaginable disadvantages of the longitudinal axis reel in requiring the hose to work at its minimum bend radius throughout the working life and requiring it to bend through two planes in winding on and off the drum, is refuted by the existence, through recent developments, of hoses of higher strength and greater low-temperature flexibility than heretofore available.

Appurtenant to the novel reel installation is an equally novel and ingenious level-wind mechanism, which permits an arrangement which offers the smallest possible circular cross-section of pod for a hose or cable of a given size. In its preferred embodiment the novel level-wind takes the form of a fairlead comprising a simple pulley canted at an angle with the vertical and having one of its diameters chordally disposed with respect to the circular cross-section of the pod or approximately tangential to the cylindrical periphery of the reel or, more exactly, tangential to the center line of the hose or cable as it comes off of the reel. The canted positioning of the pulley is such that it permits the hose or cable to trail along the center line of the pod.

In the specific exemplary form illustrated, the surface of the reel or drum is formed with a helical groove between which is a raised helical rib or land having a concave crest, this helical concavity adapted to receive the convolutions of the line. The pulley of the fairlead is rotatably mounted upon a carriage guided for longitudinal travel along tracks forming part of a longéron structure which braces the skin of the pod. The carriage includes also a pulley shaft which is perpendicular to the longitudinal axis of the drum and is provided with cam followers which are disposed for travel in the helical groove formed in the surface of the drum between the dished lands which support the line. Thus, in effect, a single-thread structure of identical pitch serves both to support the line and to feed the fairlead along the drum. It is preferred that the load carrying side of the feed groove in the drum be provided with a steel face for resisting wear.

This arrangement of level-wind eliminates the necessity of providing an archimedian screw and its necessary driving mechanism, and it is also self-timing.

Other objects and features of novelty will become apparent when the following specification is read in connection with the accompanying drawings in which one embodiment of the invention is illustrated by way of example.

In the drawings:

Figure 1 is a view in side elevation of a self-contained pod refueling unit embodying the principles of the invention, portions of the skin and framing being broken away or shown in section for clearness of illustration of the internal mechanism;

Figure 2 is a fragmentary view in vertical longitudinal section on an enlarged scale of the hose reel forming the principal part of such equipment, together with its necessary supports, conduit connections, and drive means;

Figures 2A and 2B are views at right angles to each other showing, somewhat diagrammatically, the connection between the fuel chamber and the hose;

Figure 2C is a fragmentary view in vertical section of a modified form of thread engagement for the hose on the drum, the section being taken through this portion of the device as in Figure 2;

Figure 3 is a transverse vertical section through the pod taken on line 3—3 of Figure 2, and on a still further enlarged scale;

Figure 4 is a detail view of the level-wind carriage associated with the hose reel, the view being taken from line 4—4 of Figure 3 looking in the direction of the arrows;

Figure 5 is a fragmentary sectional view through the carriage taken on line 5—5 of Figure 4;

Figure 6 is a fragmentary longitudinal sectional view of a rearward portion of the pod, illustrating the stowage of the drogue-and-coupling member;

Figure 7 is a top view of the drogue-and-coupling member taken on line 7—7 of Figure 6;

Figure 8 is a view in transverse section of the hoist for the drogue-and-coupling member;

Figure 9 is a view in perspective of a supporting fork or grapple forming a part of the drogue hoist;

Figure 10 is a transverse sectional view through the pod taken substantially on line 10—10 of Figure 6, and showing the drogue release doors in closed position; and Figure 11 is a similar view showing the doors in opened position.

Referring to the general diagrammatic view comprising Figure 1 of the drawings, it will be seen that the pod enclosing the self-contained refueling unit is designated by the reference numeral 10 and has the general profile configuration of a supplemental fuel tank. The pod is formed with a pylon 11 which is secured to any suitable depending portion of the tanker aircraft such as indicated at 12. Preferably, the securing means indicated diagrammatically at 13 are of any known quick-disconnect type so that the pod may be jettisoned under emergency conditions. Similarly, the fuel conduit from the fuel supply in the tanker aircraft leading to the conduits within the pod is provided with a quick-detachable coupling and fuel flow cut-off valve diagrammatically shown at 15 operating to prevent dumping of fuel if and when the pod is jettisoned. Also, a quick detachable electrical connection is shown diagrammatically at 16 whereby electric current may be supplied to the pod for certain auxiliary functions.

The pod may be considered as roughly divided into three sections, a forward section 10A, a mid-section 10B, and an aft section 10C. In the forward section 10A the fuel supply is received at low pressure and is adapted to be raised to a higher pressure before the fuel is delivered to the hose carried upon the reel or drum upon which it is adapted to be wound. In the mid-section 10B is disposed the hose reel from which the fuel hose may be extended to stream from the tanker aircraft and be contacted by the receiver craft. In the aft section 10C space is provided for stowing the drogue and coupling by which contact is made by the following or receiver aircraft, means also being provided for hoisting the drogue into stowed position and lowering it for trailing during refueling, hydraulically operated doors being provided for securing and releasing the drogue.

Returning now to the forward compartment 10A in the diagrammatic view designated Figure 1, it will be seen that the conduit 20 leading from the quick-disconnect valved fuel coupling 15 passes to the pump 21 from which it is directed through the fuel and vent valve 22 toward the hose. Referring also to Figure 2 of the drawings, it will be seen that the aft end of the pipe section 23 is bolted to the transverse partition or bulkhead 25 and a portion 26 of this conduit extends into the pod section 10B. The pump 21 may be driven from any suitable source such as a turbine or an electric motor, suggested by the block diagram designated 21A in Figure 1.

The drum 30 upon which the hose is wound occupies the greater portion of the intermediate section 10B and is supported for rotation upon the fixed axial shaft 31, at the forward end of which is formed a sealed coupling assembly whereby the fuel passes from the conduit section 26 into an annular distributing chamber provided at the forward end of the drum 30. Thus, the forward portion of the shaft 31 has a tubular section 33 surrounding the stub conduit 26 and entering the opening in the bulkhead 25. The rear end of the shaft 31 is fixed in the skeleton bulkhead or framing 32. The forward end portion of the drum 30 is indicated at 35 and this portion in association with the conical portion 36 of the shaft 31, and the slotted wall 36', and the bolted-on casing portion 37 enclose an annular chamber 38 into which the fuel flows from the pipe section 23 in uninterrupted smooth flow to the hose carried by the drum. The outer portion of the casing assemblage enclosing the chamber 38, which includes the drum head 35 and the casing 37 is rotatable with the drum and fluid-tight seals 39 are provided between the stationary shaft assembly 31 and these rotating parts. Bearings 40 are provided for supporting the drum upon the shaft at this forward end of the installation.

Figures 2A and 2B reveal the fuel connections from the chamber 38 to the point where the hose 45 is coupled to the fuel chambers and passageways at the head end of the drum. It will be seen that the fuel flows from the chamber 38 through a conduit section 42 in which there is interposed a butterfly valve 43. The upper portion of the conduit 42 is coupled as at 44 with the hose 45, this coupling being a readily detachable one for jettisoning the hose from the drum under certain emergency conditions. The quick-disconnect coupling 44, shown only in the most diagrammatic form here, may be of the type described in the copending application owned by the assignees of the present application, which application is Serial No. 560,463, filed January 20, 1956 in the names of Goodliffe and Macgregor. Following the schematic suggested embodiment of this detachable coupling and cut-off valve arrangement as shown in Figures 2A and 2B, it will be seen that the coupling 44 has an actuating arm 47 to which is pivotally connected as at 48 the reciprocating actuator 50 which may be moved manually or automatically to effect the jettisoning of the hose. The valve 43 interposed in the conduit 42 is here indicated as being of the butterfly type and its shaft 51 is provided with a small pinion 52 which meshes with a larger gear 53 which is rigid with a slotted lever 54 which is actuated by a pin 55 carried by the actuating rod 50. Thus the actuating movement of the lever 54 through a small angle will be multiplied to rotate the butterfly valve 42 through its full angle of 90°.

From the quick-disconnect coupling the hose 45 is wound upon the surface of the reel drum 30, which surface is of a quite novel and ingenious contour, providing both for the reception of the convolutions of the hose and also for guiding the fairlead or level-wind arrangement forming one of the important features of the invention.

In lieu of the jettisoning provisions described herein, the use of any known guillotine jettisoning means may be employed.

It will be seen that the surface of the reel is provided with a helical groove 55 preferably of rectangular section and between the turns of the helical groove 55 are the lands 56, the outer surfaces of which are dished or concave as at 57 for the reception of the convolutions of the hose 45. In Figure 1 the hose is shown completely wound upon the drum 30 while in Figure 2 the indication is that the hose is almost completely extended except for two or three turns. The level-wind or fairlead arrangement and also the means for extending the hose through appropriate openings in the pod 10 will be presently described.

The rearward support of the drum 30 upon the shaft 31 takes the form of the spider 60 which is either bolted to or forms an integral part of the drum 30 and is centrally provided with the anti-friction bearings 61 which serve to rotatably support the drum upon an intermediate section of the fixed shaft 31. Bolted to the rearward portion of the spider 60 is the internal gear 63 with which meshes the drive pinion 64 carried upon the shaft 65 which protrudes from the drive assembly 66, the forward portion 66A of which represents schematically any suitable type of reduction gear, the intermediate portion 66B represents a hydraulic motor, and the rearward portion 66C represents the control valves for the motor, inlet and outlet hydraulic connections 67 extending from this valve to the forward compartment 10A of the pod where the same source of self-contained power 21A which drives the pump 21 may furnish the hydraulic fluid to the control valve. Suitable supporting means for the unit 66 may be provided, part of which may comprise the bracket 68 extending upwardly from the shaft 31 at the forward end of the unit 66.

Of course, an electric motor could be substituted for the hydraulic one illustrated and connected by suitable wiring to the detachable electrical connection 16, which wiring can also be diagrammatically suggested by the leads 67. Also, the spur gearing shown at 63, 64 may be replaced by any equivalent form of transmission, in certain embodiments of the invention.

The means for laying on and guiding off the hose from the reel or drum 30 will now be described. Referring now more particularly to Figures 3, 4 and 5 of the drawings, it will be seen that the skin 70 of the pod 10, at the location 10B is slotted as at 71 for the passage of the hose therethrough during refueling. At the margins of the opening 71 the skin 70 is curled back as at 72 and 73 to provide smooth walls on the opening through which the hose is guided. Immediately adjacent the rounded portion 73 of the skin is disposed a longitudinally extending framing indicated generally by the numeral 75 and depicted more clearly in Figure 4 of the drawings as comprising the lateral track portions 76 and the central track or guide 77. Struts 78 serve to brace the track section 76 and 77. The structure 75 also provides a bracing longéron for the pod through the section 10B.

Arranged for travel longitudinally of the guide assembly 75 is the trolley or carriage 80, which carriage consists essentially of a flanged, basically circular, casting 81 with the side portions flattened as at 82. Extending from these flattened edges are stub shafts carrying rollers 85 which travel in the longitudinal grooves 86 formed in the tracks 76. At the forward and aft diametric portions of the casting 81 are provided ears 88 from which project rollers 89 which are guided in the groove 90 formed in the track 77. Thus, the basic or chassis portion 81 of the trolley or carriage 80 is securely guided for longitudinal movement along the guide frame 75.

Received a central bearing 92 of the frame or casting 81 is a stub shaft 93, the outer end of which is formed integrally with a substantially triangular concave plate 95, the shaft being provided with anti-friction bearings 96 about which may rotate the pulley or sheave 100 which pulley is grooved as at 101 for the reception of the hose 45.

The arc of concavity of the plate 95 corresponds to the curvature of the outer surface of the reel or drum 30 and projecting from preferably two portions of this plate are the follower rollers 103 which enter the helical groove 55 in the surface of the drum. Thus the carriage 80 with its supported pulley 101 is moved along the trackway 75 in exact synchronism with the laying on or taking off of the convolutions of the hose 45 from the lands 56 of the reel 30.

As previously mentioned, the sides of the lands 56 against which the rollers 103 bear more heavily may be specially hardened to resist wear, or a separate convex insert strip, as shown at 56' in Figure 2C, may be applied as, for example, by welding.

For a better guidance of the hose in its reverse bend from the reel to the pulley 100 a hose guard 110 may be provided, this guard being bolted as at 111 to a portion of the casting 80. The hose guard 110 or the bolts 111 may be of weakened or frangible material so that it will quickly break away and not provide any obstruction to the jettisoning of the hose if that eventuality occurs.

It will be readily understood from the above description how the convolutions of the hose are taken off at substantially right angles and passed around the pulley 100 of the level-wind or fairlead trolley 80, the position of the trolley when the hose is fully wound being shown in Figure 1 of the drawings and the approximate position at an intermediate stage being clearly indicated in Figure 2, the hose in this figure passing out from the pod through the slot 71. This slot, of course, may be provided with any suitable type of weather closure suggested at 71A which may be displaced or made yieldable to permit ready passage of the hose at any point therealong but to close all portions of the slot not immediately being occupied by the hose.

The installation in the rearward compartment 10C of the pod 10, where the drogue-and-coupling unit is stowed, will now be described with particular reference to Figures 6–11 of the drawings.

Beyond the rearward bulkhead 32 is a space into which the combined coupling and drogue member 125 is received after refueling has been completed, the bulkhead 32 being preferably a skeletonized supporting spider with a lower central portion cut away appropriately as at 126 to accommodate the fairlead and the outboard end of the hose when they are stowed as shown in Figure 1 of the drawings. The lower portion of the pod in that part of the compartment 10C occupied by the drogue member 125 is provided with doors which may be closed upon the member 125 when it is stowed or opened to permit extension and trailing of the member, as will be later described.

As is well known in the art, the hose-drogue-and-coupling installation will stream rearwardly when extended in flight and the angle of the hose will be substantially as indicated in Figure 2 of the drawings, or in the broken line portion of Figure 6, where the terminal element 125 has been brought into the limit of winding of the hose 45 on the reel 30. When the element arrives at this position it is seized by a grappling device and power means applied to hoist it into the compartment 10B, the final stowed position being that shown in solid lines in Figure 6.

The hoist device indicated generally by the reference numeral 130 will be best understood by an inspection of Figures 6, 7, 8 and 9. A hydraulic cylinder 132 has its upper end trunnioned in any suitable type of supporting bracket 131 secured to the roof skin or framework of the pod so that the cylinder may accommodate itself to a slight fore-and-aft swinging movement during operation. The cylinder 132 constitutes part of a hydraulic motor of known type and the details of the application of motive fluid need not be described. It is sufficient to indicate that a piston 133 is provided within the cylinder which is moved upwardly or downwardly therein by the application and exhaust of hydraulic fluid through the leads 134 and 135, the motive fluid being supplied preferably from a hydraulic pump 21B located in compartment 10A and driven by the independent source of power 21A contained in that compartment. The piston 133 is connected to a piston rod 136 which by means of a pivot pin 137 is connected with the ears 138 extending upwardly from the forked grapple 140 which has two forwardly extending arms 141 pivoted to a bracket 142 fixed to the framing of the pod 10. The main portion of the grappling member 140 is curved to snugly conform to the cylindrical neck portion of the drogue-and-coupling member 125 and has a pair of rearwardly extending tines 145 which are located below the center line of the larger cylindrical body portion 147 of the drogue-coupling member 125 so that the member is received upon the fork comprised by these tines 145 and vertically scooped upwardly into the compartment when the hydraulic motor, comprising the cylinder and piston combination 132, 133, is actuated.

When the piston 133 is forced upwardly in the cylinder 132 the attached grapple 140 moves to the position shown in full lines in Figure 6, whereupon the entire drogue-coupling combination is received within the confines of the pod. It will be readily understood that when the refueling operation is to be initiated, the reverse actuation of the hoist 130 is accomplished and the drogue element lowered to the broken line position in Figure 6, whereupon the unwinding of the cable from the reel 30 will permit the drogue member 125 to be trailed rearwardly from the grapple 140.

The closure devices for the drogue stowage compartment 10B will now be described with particular reference to Figures 6, 10 and 11 of the drawings.

Two longitudinally spaced, downwardly extending, supporting brackets 150, 151 are suspended from the roof of the compartment 10B and a bracket or pedestal 152 extends upwardly from a point 153 on the lower rearward portion of the pod. Rotatably received within the lower end of the bracket 150 is a stub shaft or pin 155, and a similar shaft or pintle is shown at 156 as passing through openings in the lower portion of suspended bracket 151 and the pedestal bracket 152. Pivotally mounted upon the pintle 155 are the closure supporting arms 158 and 159 and similar closure supporting arms 160 and 161 are pivoted to the rearward pintle 156.

The closure arms 158 and 159 are bowed in a somewhat arcuate form in order to clear the drogue-and-coupling element 125 when they are in their positions of closest approach to each other; and the arms 160 and 161 may take the form of segmental plates for better support of the arcuate closure members or doors 165 and 166. These doors are in the form of segments of a cylinder conforming to the radius of curvature of the section of the pod 10 in which they operate, all as clearly shown in Figures 10 and 11 of the drawings. From these figures it will be readily seen how the doors come together in their lower position as in Figure 10 to close the opening through which the drogue member 125 is admitted, and how they swing upwardly to open position for passage of the drogue member, as clearly shown in Figure 11.

For operating the closures, hydraulic motor device 170 is provided which comprises the cylinder 171 in which a piston 172 is adapted to move as influenced by the fluid pressure admitted and vented by the hydraulic connections 173 (see Figure 6). The cylinder 171 may be secured to the framing of the pod in any suitable way as, for example, by means of the brackets 175 and 176.

A piston rod 178 extends upwardly through a packed opening in the top of the cylinder 170 and carries upon its upper end a bracket 179 which carries a pivot pin 180 upon which the toggle-like arms 182 are pivotally mounted. The lower ends of these arms are pivoted as at 183 with the extensions 185 and 186 of the respective plate-like door actuating arms 160 and 161, the arm and lever combinations 160, 185 and 161, 186 being of course pivoted upon the pintle 156 carried by the brackets 151 and 152.

The various operations attendant upon the refueling procedure may of course be manually controlled, with proper and known interlocking safeguards for preventing improper actuation of the several devices, or a completely automatic control and sensing system may be provided for operating the several devices in sequence. It will be understood that broadly considered, the following steps will preferably be followed in preparing for and securing after refueling. The primary power unit 21A is started, the fuel pump 21 driven thereby supplying fuel pressure to the reel conduits 23, 42 and the connected hose 45, and the associated hydraulic pump 21B supplying pressure to the hydraulic circuits of the reel and pod closure devices. Then upon the proper actuation by well known valving devices, the closure motor 170 starts the opening of the doors 165 and 166. When the doors are fully opened as in Figure 11, the hydraulic hoist 130 is actuated by appropriate controls well known in the art to lower the grapple and extend the drogue-and-coupling member 125 downwardly out of the pod. When the hoist is fully lowered, the controls are actuated to cause the doors to begin closing and when the doors are shut, the reel is actuated by means of the motor device 66 to trail the hose. When the drogue-and-coupling element leaves the grapple, the hoist is made to retract. When the drogue-and-coupling member reaches full trail position, the fuel and vent valve 15 actuation is energized and appropriate signals given the pilot of the following aircraft as by means of the lights suggested at 190 and of course connected by wiring to the detachable electrical coupling 16 in Figure 1. Upon the following aircraft making contact with the coupling member 125, the reel may be wound in for a short distance (say approximately five feet), the fuel valve opened, and a light signal flashed indicating that that actual refueling has begun. The receiver pilot may then move between the said position of slightly forward of full trail and as far forward as formating permits while taking on fuel. When fueling is completed, the receiver retires, and at this suggested distance from full trail, either manual or automatic devices well known in the art close the fuel valve 15 and change the light signal back to the original indication. At full trail the power system, through limit switches either embodied in the motor assembly diagrammed at 66 or secured to the framework 75 and adapted to be abutted by a portion of the fair-lead carriage 80, as suggested at 200 in Figure 5, stops the reel and allows the receiver aircraft to disengage by pulling out of the reception coupling.

The unit is now in position for re-winding and the following cycle occurs in sequence. By appropriate manual or automatic actuation, the hoist starts down and when the hoist is fully lowered the doors start to open. When the doors are fully opened the reel rewinds. When the drogue-and-coupling element 125 reaches the grapple 140, the hoist retracts, raises the dorgue element into the pod and when it is fully stowed, the doors close. Then the power members may be turned off and the whole unit thus secured.

If at any time during the cycle of operation a control power failure occurs, the hose goes to full trail, the hoist comes up and the doors close. Of course when the door actuator 170 is deenergized the doors may fall shut by gravity, and the hoist device 125 may be biased toward raised position by any suitable means which may consist of a coil spring 201 within the cylinder of the device 130 as suggested in Figure 8. The hose may then be jettisoned by the means 44–50 if it becomes impossible to return the system to operation.

Since the hydraulic connections, the electrical wiring and the energizing valves and switches therefor form in themselves no part of the present invention, and can be so readily improvised by even a novice in the art to which the invention relates, they have not been illustrated except in suggestive diagrammatic form; although a worker familiar with the art would be able to fully understand the disclosure in this respect, it is suggested that reference to certain of the prior patents owned by the assignee of the persent application (such as Cobham 2,692,102) would supply much detail disclosure of these purely conventional connections.

It will be understood that except where specifically limited in the claims, the invention is not necessarily confined to refueling, and various changes and modifications may be made in the embodiment illustrated and described without departing from the scope of the invention as defined by the following claims.

Having thus decribed the invention, what is claimed as new and desired to be secured by Letters Patent is:

1. In combination with a tanker aircraft, a substantially self-contained pod supported externally of said tanker aircraft for refueling a receiver aircraft in flight, means for quick-detachably supporting said pod from said tanker aircraft as for jettisoning it in an emergency, said pod being supported with its axis substantially parallel to the line of flight, a supply of dispensable fuel in said tanker aircraft, fuel conduits in said tanker aircraft and in said pod, and a quick detachable coupling between said conduits substantially at the point of severance between the said pod and said tanker aircraft, a hose reel rotatably mounted within said pod with its axis disposed in a fore-and-aft direction and substantially parallel with the axis of the pod, a hose supported on said reel, and adapted to be trailed from the pod in effecting the refueling operation, a quick detachable coupling disposed between the inboard end of the hose and the fuel conduit in the pod, a coupling part carried by the outboard end of said hose adapted to connect with a mating coupling part carried by the receiver aircraft, said hose adapted to be wound upon and payed out from said reel, and a level-wind device movably supported within said pod adjacent said reel for guiding said hose from its position in parallel transverse convolutions on the reel to its trailed position in a vertical longitudinal plane parallel to the line of flight, and means for driving said reel, said quick-detachable couplings providing means for readily jettisoning either the hose or the pod itself.

2. In a substantially self-contained line-containing and manipulating package, adapted to be carried by a leading vehicle, said package comprising, in combination, a line reel, means for rotatably mounting said reel upon said vehicle, a line carried by said reel for winding on and paying off from said reel, and a coupling part on the end of said line for connection to a cooperating part on another vehicle or the like, a guiding trackway in said package and disposed longitudinally thereof, a level-wind carriage having a fairlead thereon in said package adjacent said reel and adapted to be guided in longitudinal movement along said reel by said trackway, means on said fairlead for receiving and guiding successive portions of said line from transverse convolutions on the reel to trailing condition, said fairlead for this purpose being provided with means for throwing a substantially right angle bend in said portions of the line, said package being of an approximately circular cross-section, said fairlead comprises a grooved pulley the plane of which is chordal with respect to said package and substantially tangential to the winding surface of said reel, said pulley having its axis extending substantially radially with respect to the reel, said guiding trackway being disposed between the plane of said pulley and the outer wall of said package, and follower means are provided on said fairlead for guiding it along the trackway.

3. In a substantially self-contained line-containing and manipulating package, adapted to be carried by a leading vehicle, said package comprising, in combination, a line reel, means for rotatably mounting said reel upon said vehicle, a line carried by said reel for winding on and paying off from said reel, and a coupling part on the end of said line for connection to a cooperating part on another vehicle or the like, a guiding trackway in said package and disposed longitudinally thereof, a level-wind carriage having a fairlead thereon in said package adjacent said reel and adapted to be guided in longitudinal movement along said reel by said trackway, means on said fairlead for receiving and guiding successive portions of said line from transverse convolutions on the reel to trailing condition, said fairlead for this purpose being provided with means for throwing a substantially right angle bend in said portions of the line, said reel being provided with a helical groove throughout the cylindrical periphery comprising its winding surface, and follower means carried by said fairlead for riding in said groove and thus moving said fairlead along said trackway, said groove being of substantially the same pitch as the line convolutions so that the fairlead moves along said reel in synchronism with the winding on or paying off of the line, the ridge or land remaining between the convolutions of the groove serving to support the line convolutions, and for this purpose the crest of said land being concaved with a curvature substantially similar to that of the cross-section of the line.

4. In a substantially self-contained line-containing and manipulating package, adapted to be carried by a leading vehicle, said package comprising, in combination, a line reel, means for rotatably mounting said reel upon said vehicle, a line carried by said reel for winding on and paying off from said reel, and a coupling part on the end of said line for connection to a cooperating part on another vehicle or the like, a guiding trackway in said package and disposed longitudinally thereof, a level-wind carriage having a fairlead thereon in said package adjacent said reel and adapted to be guided in longitudinal movement along said reel by said trackway, means on said fairlead for receiving and guiding successive portions of said line from transverse convolutions on the reel to trailing condition, said fairlead for this purpose being provided with means for throwing a substantially right angle bend in said portions of the line, the reel being disposed with its axis in the fore-and-aft direction, an opening provided in the lower portion of the wall of the package aft of the line reel, through which the terminal coupling part on the outboard end of the line may be hoisted for stowing it within the package when the line is fully reeled in, means for hoisting and lowering said coupling part, said hoisting means comprising a forwardly pivoted scoop-like member normally during trailing being completely disassociated from said coupling and hose, means pivotally supporting the forward portion of said member from a portion of the fixed internal structure of said package, whereby said member may be swung from an inboard position to an outboard position and upon which said coupling part is moved when said line is fully reeled in, and means operatively connected with said member for swinging it from outboard position to inboard position and vice versa.

5. The device as set forth in claim 4 in which said scoop-like member comprises a fork having a pair of spaced rearwardly extending tines adapted to straddle the lower portion of the coupling member and cradle it between said tines when said coupling member arrives at its fully reeled in position.

6. In combination with a leading aircraft, a substantially self-contained line-containing and manipulating unit carried by said leading aircraft, a reel rotatably mounted within said unit, a line adapted to be trailed from the unit, a coupling part at the outboard end of said line adapted to be connected with a following aircraft, said line adapted to be wound upon and payed out from said reel, and a level-wind device for guiding said line from its position in parallel transverse convolutions on the reel to its trailed position in a substantially vertical plane parallel to the line of flight, means for driving said reel, an opening in the wall of said unit through which said terminal coupling may pass in either direction in preparation for trailing the line or for stowing said coupling, and means for receiving and guiding said terminal coupling through said opening into said unit when the line is completely reeled in, said last named means comprising a fork member normally during trailing being completely disassociated from said coupling and hose, means pivotally supporting the forward portion of said member from a portion of the fixed internal structure of said package, whereby said member may be swung from an inboard position to an outboard position and upon which said coupling part is adapted to be carried when said line is fully reeled in, and a closure for said opening and power means for operating said closure.

7. In combination with a tanker aircraft, a substantially self-contained hose-containing and manipulating unit carried by said tanker aircraft for refueling a receiver aircraft in flight, means supporting said unit in said tanker aircraft, a hose reel rotatably mounted within said unit, a hose having its inboard end coupled to the source of fuel to be transferred and adapted to be trailed from the unit in effecting the refueling operation, a coupling part at the outboard end of said hose adapted to connect with a mating coupling part carried by the receiver aircraft, said hose adapted to be wound upon and payed out from said reel, and a level-wind device for guiding said hose from its position in parallel transverse convolutions on the reel to its trailed position in a vertical longitudinal plane parallel to the line of flight, means for driving said reel, an opening in the wall of said unit through which said terminal coupling may pass in either direction in preparation for trailing the hose or for stowing said coupling after refueling, and means for receiving and guiding said terminal coupling through said opening into said unit when the hose is completely reeled in, said last named means comprising a fork member normally during trailing being completely disassociated from said coupling and hose, means pivotally supporting the forward portion of said member from a portion of the fixed internal structure of said package, whereby said member may be swung from an inboard position to an outboard position and upon which said coupling part is adapted to be carried when said line is fully reeled in, and a closure for said opening and power means for operating said closure.

References Cited in the file of this patent

UNITED STATES PATENTS

| | | |
|---|---|---|
| 1,848,372 | Moran | Mar. 8, 1932 |
| 1,848,994 | Chilese | Mar. 8, 1932 |
| 2,451,100 | Lecompte | Oct. 12, 1948 |
| 2,502,650 | Harris et al. | Apr. 4, 1950 |
| 2,596,455 | Williams et al. | May 13, 1952 |
| 2,634,926 | Worledge | Apr. 14, 1953 |
| 2,679,434 | Herrman | May 25, 1954 |
| 2,692,102 | Cobham et al. | Oct. 19, 1954 |
| 2,760,777 | Cotton | Aug. 28, 1956 |
| 2,788,243 | Goodliffe et al. | Apr. 9, 1957 |
| 2,823,881 | Patterson | Feb. 18, 1958 |
| 2,859,002 | Leisy | Nov. 4, 1958 |

FOREIGN PATENTS

| | | |
|---|---|---|
| 603,203 | Great Britain | June 10, 1948 |
| 628,081 | Germany | Mar. 30, 1936 |

OTHER REFERENCES

"Aviation Week" magazine, August 15, 1955, vol. 63, No. 7, pages 53 and 55.